Patented June 24, 1924.

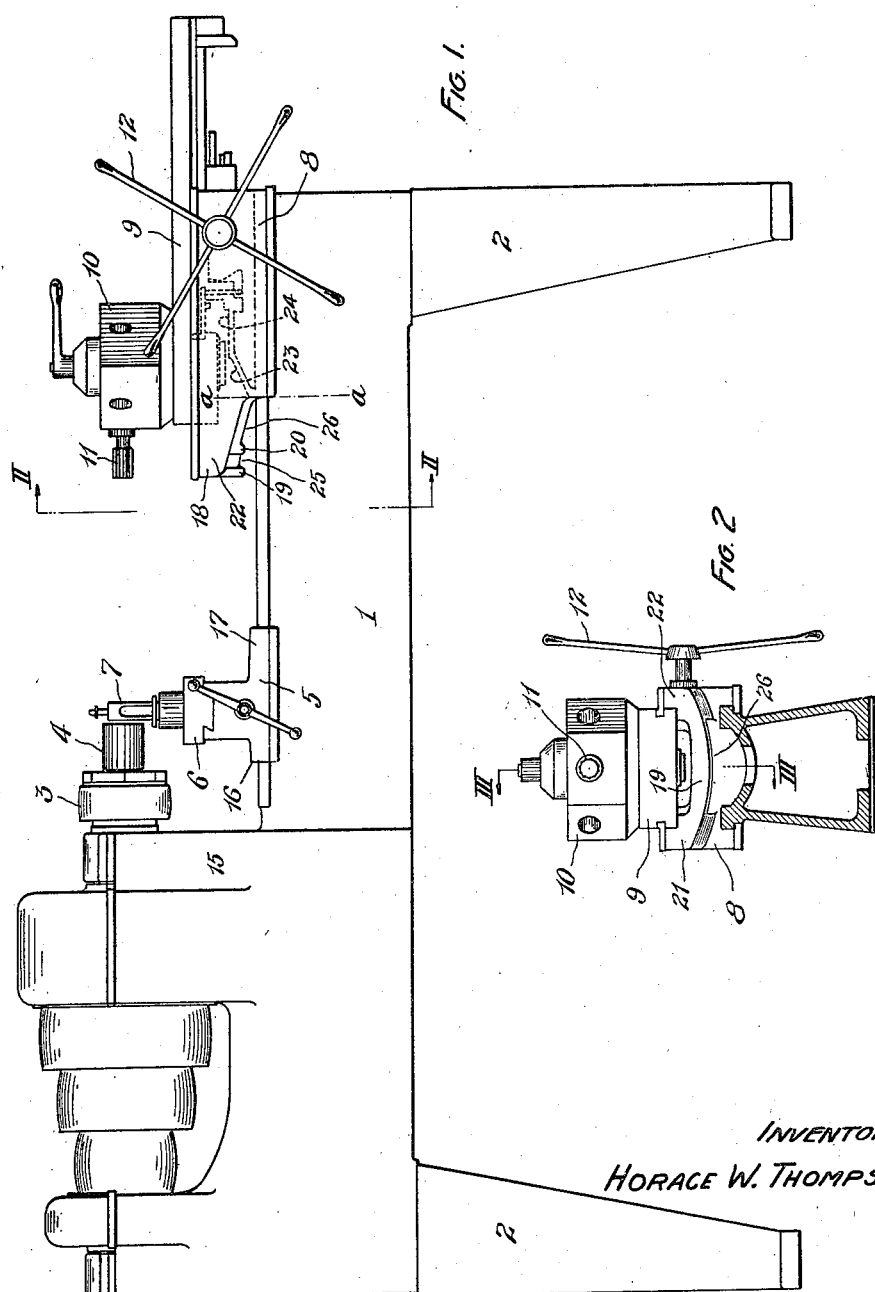

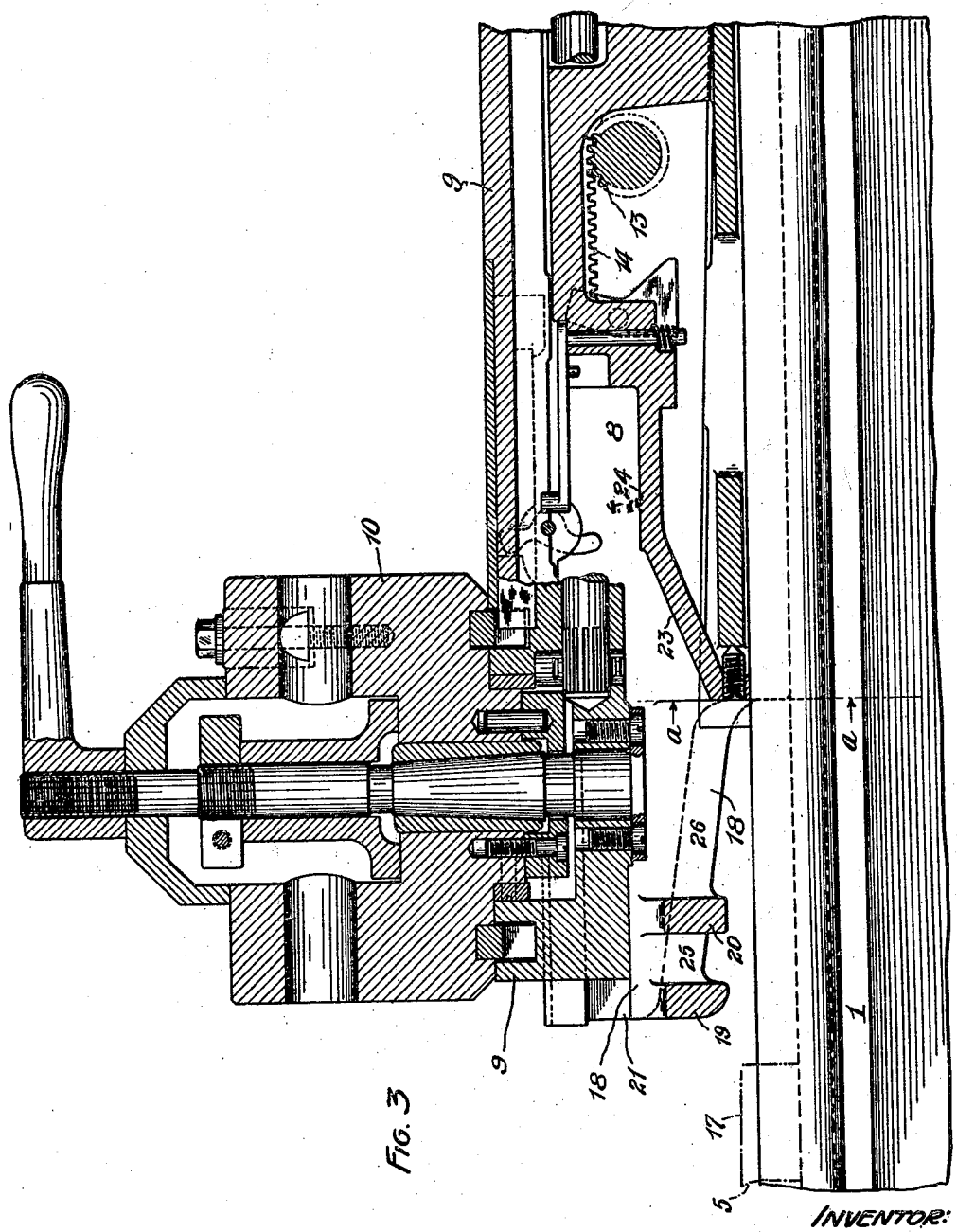

1,498,821

UNITED STATES PATENT OFFICE.

HORACE W. THOMPSON, OF EAST CLEVELAND, OHIO, ASSIGNOR TO BARDONS & OLIVER, OF CLEVELAND, OHIO, A PARTNERSHIP CONSISTING OF JOHN G. OLIVER AND RAYMOND T. CRAGIN.

TURRET-MACHINE TURRET SADDLE.

Application filed April 10, 1922. Serial No. 551,127.

*To all whom it may concern:*

Be it known that I, HORACE W. THOMPSON, a citizen of the United States, residing at East Cleveland, in the county of Cuyahoga and State of Ohio, have invented certain new and useful Improvements in Turret-Machine Turret Saddles, of which the following is a specification.

My invention relates particularly to that part of the machine which supports the turret slide and which is known as the turret saddle. Among the objects of my invention are the provision of a turret saddle which shall provide a bearing support for the turret slide directly under the turret, when the turret and turret slide have been fed forward toward the work; the provision of a turret saddle which shall provide a support for the turret slide and turret, directly under the turret, when they have been fed forward toward the work without interfering with the cut-off saddle; and the provision of a turret saddle having a guard adapted to prevent flying chips from entering the space between the turret saddle and the turret slide where without my improvement they frequently collect and clog the turret actuating mechanism. These and other objects are accomplished by the use of my invention described in these specifications and shown in the accompanying drawings in which—

Fig. 1 is a side elevation of a turret lathe having a turret saddle built in accordance with my invention;

Fig. 2 is a section on line II—II of Fig. 1; and

Fig. 3 is a section on line III—III of Fig. 2.

Referring to the drawings 1 represents a turret lathe bed supported upon the legs 2—2. 3 is the chuck or collet end of the lathe spindle and 4 represents, conventionally, the work which is being machined in the lathe. 5 is the cut-off saddle which carries the cut-off slide, 6, upon which is secured the cutting-off-tool post, 7. 8 is the turret saddle which is adapted to slide longitudinally of the lathe bed, 1, and to be locked at any point desired in the customary manner. 9 is the turret slide, 10 the turret and 11 is a tool, such as a reamer, in one of the turret tool sockets. The turret slide, 9, is adapted to slide longitudinally of the turret saddle, 8, and, as shown, means for moving the slide forward and back toward and away from the work is provided in the hand wheel, 12, which has fixed upon its shaft the pinion, 13, engaging rack, 14. The shaft of the hand wheel, 12, has bearings in the turret saddle, 8, so that when the hand wheel is operated the feed pinion, 13, transmits the movement to the slide, 9, and thus feeds the turret and its presented tool toward and away from the work.

Heretofore turret saddles have been provided with turret slide bearings extending toward the work only as far as the end of the saddle bearing upon the lathe bed as indicated by line a—a in Fig. 1. The turret slide in such constructions is unsupported directly below the turret when in the forward position. As it is necessary that the cut-off saddle, 5, be sometimes positioned close to the head stock, 15, it is customary to shorten the bearing of the cut-off saddle, 5, upon the lathe bed at the end toward the head stock as shown at 16. In order that the cut-off saddle may have a suitable length of bearing upon the lathe bed when the forward end, 16, has been shortened, an equivalent bearing length is added to the rear end of the cut-off saddle as shown at 17. This lengthening of the rear end of the cut-off saddle limits the movement of the turret saddle toward the work so that in turret lathes as heretofore constructed the unsupported over hanging of the turret and turret slide is necessary when the turret is in the forward position. This frequently results in vibration and chattering of the tools and unsatisfactory performance of the machine.

To overcome this objection I have provided upon the turret saddle, 8, the extension, 18, preferably cast integrally with the saddle, 8. This extension, 18, provides a bearing for the forward end of the turret slide directly under the turret when it has been fed forward but it does not limit the movement of the turret saddlie toward the work as the extension, 18, is so shaped and positioned that it will clear the cut-off saddle and permit the end, a—a, of the turret saddle to travel as far forward toward the work as it could previous to the addition of the extension, 18. The turret saddle extension, 18, is preferably made so that the turret saddle may be positioned with the extension, 18, over hanging the cut-off saddle, 5. The extension, 18, therefore forms an over hanging bracket support for the turret slide, out of contact with the lathe bed and adapted to overlap the cut-off saddle. Ribs or cross tie bars, 19—20, are provided to join and strengthen the two side portions, 21 and 22, of the extension, 18, and to serve as guards or deflectors to prevent flying chips from collecting upon the surfaces, 23 and 24, of the turret saddle. It will be observed that ribs, 19 and 20, are positioned so as to clear the turret slide and mechanism and also to clear the cut-off slide extension, 17. It will be further observed the surfaces of ribs, 19 and 20, are presented towards the work so that they intercept and deflect flying chips that might otherwise strike and collect upon the turret saddle. Openings such as 25 and 26, are provided between the bearing extensions, 21 and 22, to permit any chips which may enter over the tops of ribs, 19 and 20, through the open space, 26, to drop downward and not collect upon the turret saddle.

Heretofore without the use of the extension, 18, and the ribs, 19 and 20, flying chips, especially of brass and cast iron, collected in quantities upon the surfaces, 23 and 24, got into the path of the turret base and operating mechanism and clogged the latter so as to render the machine inoperative until the turret slide and mechanism were taken apart and the chips removed.

I have found that the use of my invention prevents the collection of chips and the consequent loss of time and expense as well as wear and tear upon the machine in these sensitive parts.

Having thus described my invention I claim:

1. In a turret machine a turret saddle provided with a forwardly over hanging bearing support for the turret slide, transverse ribs connecting the opposite sides of said over hanging bearing portion and an opening between said ribs.

2. In a turret lathe, a turret saddle provided with turret slide bearings extending longitudinally thereof, said turret saddle having an overhanging extension at its forward end comprising a pair of arms one on either side forming overhanging extensions to said turret slide bearings, and a cross tie bar joining said arms.

3. In a turret lathe, a turret saddle provided with turret slide bearings extending longitudinally thereof, said turret saddle having an overhanging extension at its forward end comprising a pair of arms, one on either side, forming overhanging extensions to said turret slide bearings, and a chip deflector disposed between said arms and extending transversely thereto.

In testimony whereof I affix my signature.

HORACE W. THOMPSON.